UNITED STATES PATENT OFFICE.

CHARLES TENNANT LEE, OF BOSTON, MASSACHUSETTS, ASSIGNOR OF ONE-HALF TO THE GOULD & WATSON COMPANY, OF SAME PLACE.

COMPOSITION OF MATTER.

SPECIFICATION forming part of Letters Patent No. 409,985, dated August 27, 1889.

Application filed July 25, 1888. Serial No. 281,016. (No specimens.)

*To all whom it may concern:*

Be it known that I, CHARLES TENNANT LEE, of Boston, county of Suffolk, State of Massachusetts, have invented a certain new and useful Improvement in Composition of Matter, of which the following is a specification.

The object of my invention is the production of a composition of matter which may withstand a high degree of heat, and which shall be of low conductivity; and it consists of a compound of mica and silicate of soda, as hereinafter described.

Mica is known to be a good non-conductor. In preparing sheets of mica for commercial purposes a considerable accumulation of scrap mica occurs, which is of comparatively little value. In the manufacture of my improved compound this scrap mica may be utilized. I prepare this scrap by comminuting it in any suitable grinding-machine until it is reduced to flakes, preferably of from one-quarter to one-twentieth of an inch in size. The size of the flakes or scales of mica is obviously not of great importance so long as they are small enough to be worked as hereinafter described and not so small as to be too largely reduced to dust or powder, thus practically destroying their flaky character. I mix this comminuted mica with commercial silicate of soda or water-glass in the proportion of about two and one-half parts of mica to four of the silicate and enough water to make the mass work well under the trowel. One or more coats of this plastic mass may be placed wherever it is desired to form a surface of low conductivity which will resist high temperatures, or it may be pressed and molded into solid or hollow objects for the same purpose. In case the compound is to be molded, the water may be omitted and more silicate of soda used, according to the result desired, whether of a greater or less degree of hardness. It will be clear that the proportion of mica employed will vary somewhat with the uses to which the compound is to be put and whether it is to be molded or not.

The scales or flakes of mica are preferable to mica-dust, since they render the compound stronger and capable of resisting more effectively a higher degree of heat. If the mass is to be molded, especially into hollow objects, as cylinders and the like, strength is of considerable importance.

I am aware that an insulating composition consisting of pulverized mica, silicate of soda, and an earthy substance is not new, the same being shown in Letters Patent to Charles U. Van Depoele, No. 353,653, dated November 30, 1886. By omitting the earthy substance from my composition its insulative power is increased, since the insulative power of a mass is no greater than the insulative power of its most conductive component. Furthermore, all chemical combination between the alkaline silicate and the earthy substance is avoided, and such chemical combination interferes with the non-conductive quality of the composition, as also with its hardness. The silicate and mica alone form a very hard mass on drying, which is desirable.

What I claim is—

The herein-described composition of matter, consisting solely of comminuted mica and silicate of soda mixed, as set forth.

CHARLES TENNANT LEE.

Witnesses:
 WM. A. MACLEOD,
 ROBERT WALLACE.